United States Patent [19]

Beghini

[11] 4,284,104
[45] Aug. 18, 1981

[54] SAFETY VALVE FOR PACKAGES

[76] Inventor: Pierre-Gino Beghini, 42, rue d'Avron, Paris, France, 75020

[21] Appl. No.: 88,380

[22] Filed: Oct. 26, 1979

[30] Foreign Application Priority Data

Nov. 9, 1978 [FR] France ................................ 78 31744

[51] Int. Cl.³ ............................................. F16K 15/14
[52] U.S. Cl. ................................................. 137/859
[58] Field of Search ...................... 137/859, 852, 853; 215/260; 220/209, 375

[56] References Cited

U.S. PATENT DOCUMENTS

| 2,638,263 | 5/1953 | Jesnig | 137/852 X |
| 2,640,481 | 6/1953 | Conley | 137/859 X |
| 2,713,953 | 7/1955 | Jewell | 215/260 |
| 3,174,641 | 3/1965 | Kitterman | 215/260 |
| 3,827,456 | 8/1974 | Sheppard | 137/859 |
| 3,854,618 | 12/1974 | Beghini | 220/306 |
| 4,129,143 | 12/1978 | Hoffmann | 137/859 |
| 4,188,978 | 2/1980 | De Lorenzo | 137/859 |

FOREIGN PATENT DOCUMENTS

| 965947 | 2/1950 | France | 137/859 |
| 1123729 | 9/1956 | France | 137/859 |

*Primary Examiner*—William R. Cline
*Attorney, Agent, or Firm*—Lerner, David, Littenberg & Samuel

[57] ABSTRACT

A safety valve meant to be fitted on an impervious wall separating two separate spaces.

According to the invention, the valve comprises on the one hand, a first stationary and relatively rigid part, which is meant to be fixed on the wall and comprises a first cylindrical sleeve and on the other hand, a second part at least partly flexible and resilient, adapted to be connected with the first fixed part and comprising a second cylindrical sleeve, co-axial to the first and coming into sealing contact thereon or moving away therefrom depending on the resilient deformations to which the second part is at least partly subjected because of the pressure differences existing on either sides of the wall.

10 Claims, 7 Drawing Figures

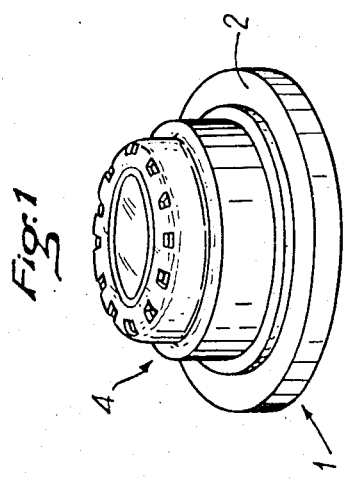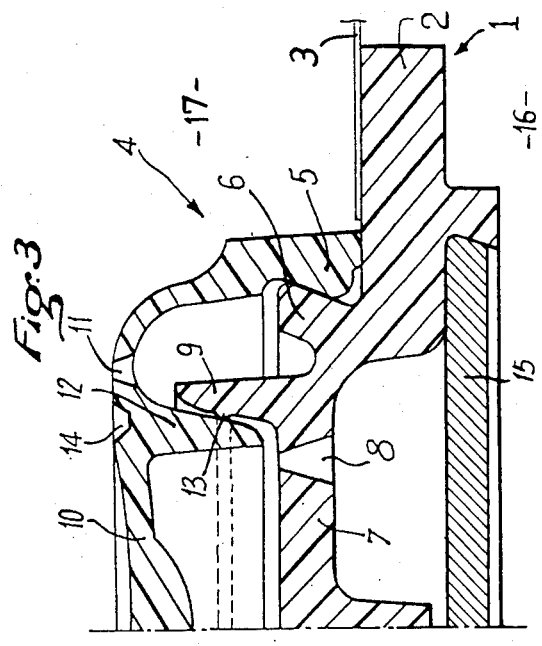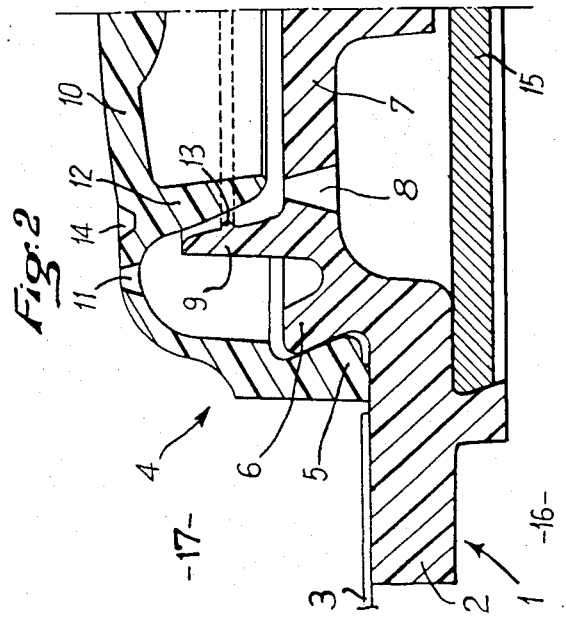

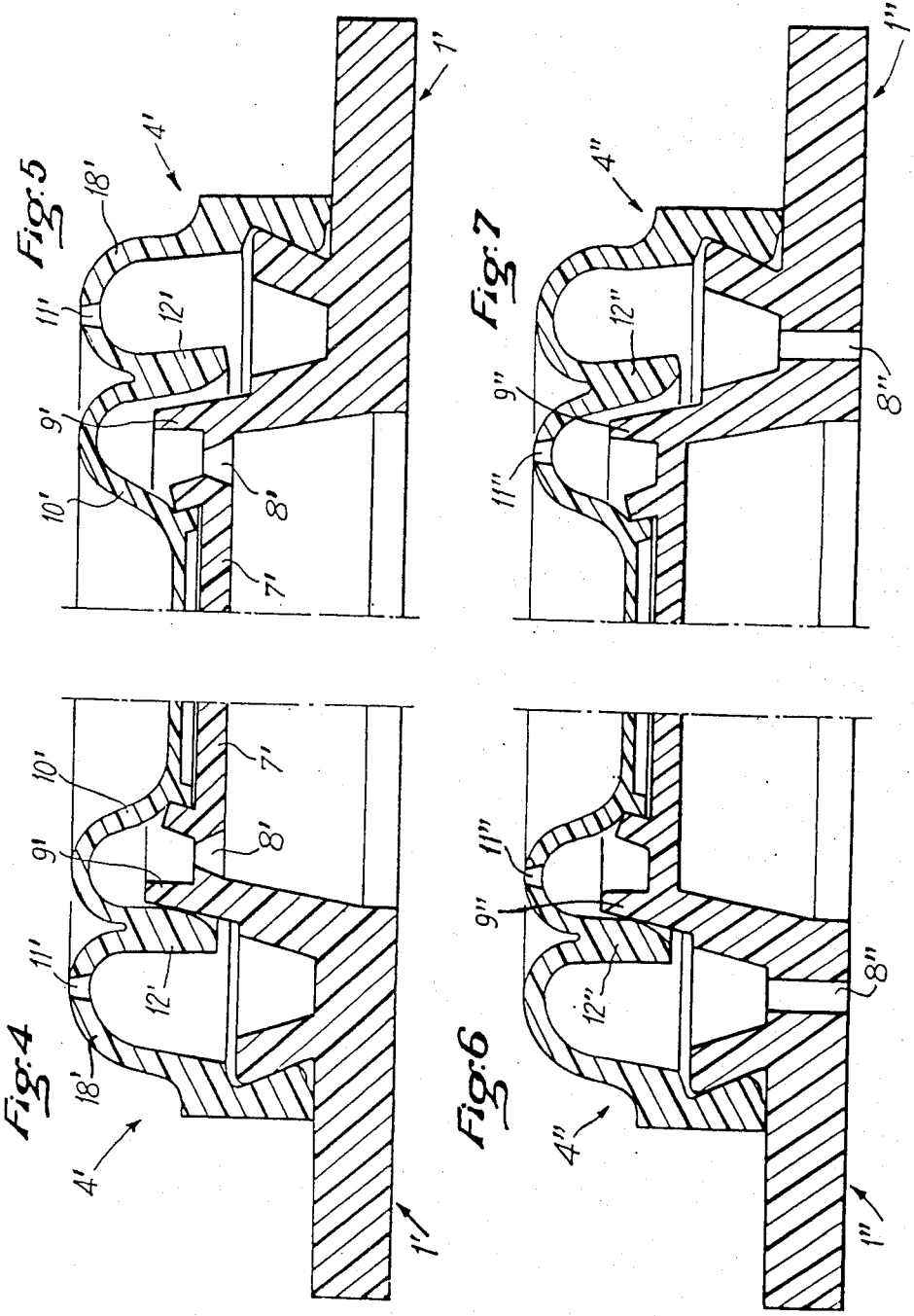

SAFETY VALVE FOR PACKAGES

BACKGROUND OF THE INVENTION

The present invention relates to a bidirectional safety valve, and in particular, although not exclusively, a valve adapted to be mounted on a package, which for example, is flexible.

It is known that certain foodstuffs, such as coffee for example, release gases which, when they are packed, might inflate the bag containing them thereby causing these bags to burst, unless the said bags are provided with valves adapted to let out the said gases above a certain threshold of pressure prevailing inside said bags, such as described for example in U.S. Pat. No. 2,638,263.

The object of the present invention is a bidirectional valve adapted for such an application.

SUMMARY OF THE INVENTION

The safety valve according to the invention, which is meant to be placed on an impervious wall separating two separate spaces, is remarkable in that it comprises on the one hand, a first, stationary and relatively rigid part to be fixed on said wall and provided with a first cylindrical sleeve and, on the other hand, a second part which is, at least partly, relatively flexible and resilient, adapted to be connected with the said first fixed part and comprising a second cylindrical sleeve, co-axial to the first, and coming into sealing contact thereon or moving away therefrom, depending on the elastic deformations to which the second part is at least partly subjected, due to the pressure differences existing on either side of the wall.

The second sleeve may be internal or external to the said first sleeve. In the same way, the openings creating a communication between the inside of the valve and the outside, are such that the ones provided in the said first part of valve are internal or external to the said sleeves, the ones made in the second part being then external or internal to the sleeves.

In a preferred embodiment, the second part of valve is produced as a cover locking onto the said first part. Said cover can, if necessary, be connected to the first part by means of a small tab. Preferably, the said first and second parts are made of synthetic material, and the connecting strip, when there is one, is molded therewith.

In order to ensure a good tightness in the closed position, at the level of the sleeves it is advantageous that at least one of said sleeves be provided on its face situated opposite the other sleeve, with a peripheral bead, acting as an O-ring. It is further advantageous if, at least in the contact area, at least one of the sleeves is ellipsoidal or curved in axial cross-section.

BRIEF DESCRIPTION OF THE DRAWINGS

The invention will be better understood on reading the following description, reference being made to the accompanying drawings in which:

FIG. 1 is a perspective view of a preferred embodiment of the valve according to the invention.

FIGS. 2 and 3 are axial half-sections in open and closed positions respectively of the embodiment shown in FIG. 1.

FIGS. 4 and 5 are axial half-sections of a variant embodiment, in the closed and open positions respectively.

FIGS. 6 and 7 are corresponding views of another variant embodiment.

DETAILED DESCRIPTION OF THE PREFERRED EMBODIMENTS

The valve according to the invention, shown in FIGS. 1 to 3, comprises a first fixed portion 1, provided with a flange 2 for securing it to a wall 3, for example by hot soldering or by ultrasonic means, and a second part 4, shaped as a cover or cap, locking by its periphery onto said part 1, due to rims 5 and 6 clicking in together. The valve parts 1 and 4 can be produced by molding a synthetic material and can be joined together by means of a connecting tab, not shown.

Opposite the part 4, the part 1 is closed by a base 7, provided with peripheral holes 8.

Outside the holes 8, the base 7 is integral with a sleeve 9 projecting towards the part 4. In the same way, the cover 4 is provided with a flexible and resilient base 10, having peripheral holes 11. Inside the said holes 11, the base 10 is integral with a sleeve 12, projecting towards the base 7 of the part 1. The sleeve 12 is co-axial to the sleeve 9 and internal thereto.

The faces of the sleeves 9 and 12, capable of facing each other, that-is-to-say the inside face of the sleeve 9 and the outer face of the sleeve 12, can be brought clear one from the other when the base 10 bulges outwardly (FIG. 2), or they can be partly resting one on the other when the base 10 is drawn towards the base 7 (FIG. 3). In this last case, tightness is ensured by the valve between the two spaces separated by the wall 3.

In order to obtain a good tightness, it is advantageous for the opposite faces of the sleeves 9 and 12 to be ellipsoidal or curved in cross-section, at least where they are in contact one with the other. Tightness may be further improved if, at molding time, a beading 13 acting as an O-ring, is provided on the inside face of the sleeve 9 for example.

In order to increase the flexibility of the base 10, and thus the sensitivity of the valve according to the invention, a peripheral groove 14 is provided in the outer face of the cover 4, adjacent the sleeve 12.

A filter 15 for letting through gases only, and for stopping all dusts, may be provided. Said filter may be clasped on the fixed part 1.

It is thus obvious that when the pressure of the gas contained in the space 16 found beneath the wall 3 (with reference to FIGS. 2 and 3) is greater than the gas pressure prevailing in the space 17 found above said wall, the base 10 bulges outwardly, because of the communication holes 8. As a result, the gas may flow from space 16 towards space 17 through the holes 8, between the sleeves 9 and 12, and then through holes 11 (FIG. 2). On the contrary when the pressure of the gas contained in space 16 is less than the pressure of the gas contained in space 17, the base 10 is drawn towards the base 7 and the sleeves 9 and 12 are resting one against the other, ensuring complete tightness between spaces 16 and 17 (FIG. 3).

The valve according to the invention is thus particularly adapted for use on the wall 3 of bags or such packages. In this case, the space 16 represents te inside of the bag or packet and the space 17 represents the surrounding atmosphere.

The product (not shown) contained inside such a bag is initially packed in vacuo, the position then being that shown in FIG. 3 wherein the valve isolates the two spaces 16 and 17. It will be noted that the vacuum inside the bag may be made in a vacuum chamber when the bag is being filled and before the bag is closed, or the vacuum may be created through the valve once the bag is filled and closed off.

When the packed product releases a gas and when the pressure of that gas becomes greater than the atmospheric pressure, the valve will open (FIG. 2) in order to perform its function of safety. It will be noted that the same occurs when the bag is squeezed, thereby permitting to smell the aroma of the product packed inside the bag, which aroma is carried by the gases then delivered by the valve.

In the variant embodiment shown in FIGS. 4 and 5, the sleeve 12' of the cover 4' is found on the outside of the sleeve 9' of part 1', the holes 8' remaining inside the sleeve 9' and the holes 11' outside the sleeve 12'. In this case, the central part of the base 10' clips in the central part of the base 7' and the valve system created by the parts 9' and 12' works due to the resilient deformation of the peripheral part 18' of the cover 4' and not, as this is the case in FIGS. 2 and 3, of the central part of the base.

The variant of embodiment shown in FIGS. 6 and 7 is similar to the one shown in FIGS. 4 and 5, except that the holes 8" are then found to be on the outside of the sleeve 9" and the holes 11" on the inside of the sleeve 12".

What is claimed is:

1. A safety valve for the wall of a container, said valve comprising:
   a first member having a main body portion adapted to be affixed to the wall of the container, said main body portion having first opening means therethrough, and said first member including an upstanding annular surface extending away from said main body portion;
   a second member for connection to said first member, said second member having a main body portion sized to overlie and enclose said upstanding annular surface and said first opening means, said main body portion of said second member having second opening means therethrough, and said second member including an annular sleeve extending away from the surface of said main body portion of said second member;
   one of said first and second opening means being positioned inside of its respective annular surface or annular sleeve, and the other of said first and second opening means being positioned outside of its respective annular surface or annular sleeve; and
   said annular sleeve being sized so as to cooperate with said annular surface on said first member to seal said first opening means from said second opening means when the pressure differential across the wall of the container is below a predetermined differential limit, and said second member and said annular sleeve being sufficiently flexible so that said annular sleeve moves away from said annular surface when the pressure differential across the wall of the container exceeds said predetermined differential limit to permit said first opening means to communicate with said second opening means.

2. The safety valve as claimed in claim 1 wherein said first and second members are made of a synthetic material.

3. The safety valve as claimed in claim 1 wherein said annular surface of said first member is outside said annular sleeve of said second member.

4. The safety valve as claimed in claim 1 wherein said annular surface of said first member is inside said annular sleeve of said second member.

5. The safety valve as claimed in claim 1 further including a peripheral bead acting as an O-ring on at least one of said annular surface and said annular sleeve.

6. The safety valve as claimed in claim 1 wherein at least one of said annular surface and said annular sleeve is curved in the contact area between said annular surface and said annular sleeve.

7. A safety valve for the wall of a container, said valve comprising:
   a first member adapted to be affixed to the wall of the container, said first member having first opening means extending therethrough and a first annular sleeve surrounding said opening means;
   a second member for connection to said first member, said second member being sized to overlie and enclose said first opening means and said first annular sleeve, said second member having a second annular sleeve and second opening means, said second opening means extending through said second member outside of said second annular sleeve, and said second annular sleeve being sized to be received within said first annular sleeve when said second member is connected to said first member; and p1 said second annular sleeve cooperating with said first annular sleeve to seal said first opening means from said second opening means when the pressure differential across the wall of the container is less than a predetermined value, and said second member and said second annular sleeve being sufficiently flexible so that said second annular sleeve moves inwardly away from said first annular sleeve when the pressure differential across the wall of the container is greater than said predetermined value to thereby permit said first opening means to communicate with said second opening means.

8. The safety valve as claimed in claim 7 wherein said first and second members are made of a synthetic material.

9. The safety valve as claimed in claim 7 further including a peripheral bead acting as an O-ring on the face of at least one of said first and second annular sleeves.

10. The safety valve as claimed in claim 7 wherein at least one of said first and second annular sleeves is curved in the contact area between said first and second annular sleeve.

* * * * *

UNITED STATES PATENT AND TRADEMARK OFFICE
CERTIFICATE OF CORRECTION

PATENT NO. : 4,284,104

DATED : August 18, 1981

INVENTOR(S) : Pierre-Gino Beghini

It is certified that error appears in the above-identified patent and that said Letters Patent are hereby corrected as shown below:

Column 4, line 38, cancel "p1".

Signed and Sealed this

Eighth Day of December 1981

[SEAL]

Attest:

Attesting Officer

GERALD J. MOSSINGHOFF

Commissioner of Patents and Trademarks